United States Patent [19]
Norton

[11] 4,453,865
[45] Jun. 12, 1984

[54] AUTOMATIC PRESSURE SENSITIVE REGULATION ASSEMBLY

[75] Inventor: Richard C. Norton, Boston, Mass.

[73] Assignee: Stone & Webster Engineering Corp., Boston, Mass.

[21] Appl. No.: 400,397

[22] Filed: Jul. 21, 1982

[51] Int. Cl.³ ............................................. B65G 53/66
[52] U.S. Cl. ...................................... 406/24; 406/137; 406/146; 406/108
[58] Field of Search ........................ 406/12, 14, 23, 24, 406/29, 30, 32, 108, 122, 127, 137, 138, 144, 146, 191, 192, 194; 222/61, 195, 637; 414/217; 110/245; 122/4 D; 431/7, 170; 165/104.16

[56] References Cited
U.S. PATENT DOCUMENTS
| | | | |
|---|---|---|---|
| 2,623,793 | 12/1952 | Hill | 406/14 |
| 2,684,869 | 7/1954 | Lapple | 222/637 |
| 2,726,137 | 12/1955 | Davis, Jr. | 406/122 X |
| 2,880,170 | 3/1959 | Savoca et al. | 414/217 X |
| 4,240,377 | 12/1980 | Johnson | 122/4 D |

FOREIGN PATENT DOCUMENTS
1300935 12/1972 United Kingdom ............... 406/108

*Primary Examiner*—Jeffrey V. Nase
*Attorney, Agent, or Firm*—Hedman, Gibson, Costigan & Hoare

[57] ABSTRACT

An automatic pressure sensitive regulation assembly and process is provided for use with a non-mechanical particulate solids flow apparatus. The automatic pressure sensitive regulation assembly comprises first and second pressurized fluid distributors. The first pressurized fluid distributor provides incipient fluidization of the particulate solids in the vicinity of the automatic pressure sensitive regulation assembly and an attendant hydrostatic pressure. The second pressurized fluid distributor senses variations in the hydrostatic pressure as a function of the particulate solids level, and in response thereto directly varies the flow of pressurized fluids to the downstream end of the particulate solids flow apparatus to change the rate of flow of particulate solids at the same rate as received.

9 Claims, 4 Drawing Figures

AUTOMATIC PRESSURE SENSITIVE REGULATION ASSEMBLY

CROSS-REFERENCE TO RELATED APPLICATIONS

This application is related to U.S. patent application Ser. No. 342,393 filed Jan. 25, 1982 by Richard Norton and Paul Koppel entitled "SOLIDS FLOW REGULATOR".

FIELD OF THE INVENTION

The invention relates to devices for measuring pressure and making adjustments to compensate for variations in pressure. More particularly, the invention relates to an automatic pressure sensitive regulation apparatus for use in a system employing a flow of particulate solids. As explained further herein, the subject invention is particularly well adapted for use with existing solids flow regulators. The invention automatically senses the height of particulate solids, and causes an immediate adjustment to the flow rate.

BACKGROUND OF THE INVENTION

Particulate solids are used in a variety of applications including chemical processing and steam generation. For example, particulate solids are widely used to accomplish hydrocarbon cracking and heat transfer. In many applications, the particulate solids are heated to a very high temperature, typically above 1500° F., and are caused to move through the system at high flow rates.

In the past, problems have been encountered in regulating the flow of particulate solids. Specifically, the high temperatures and high flow rates of the solids adversely affect the performance and life of mechahical valves. Consequently, various non-mechanical flow control means have been developed to appropriately regulate the flow of particulate solids.

U.S. patent application Ser. No. 342,393, filed Jan. 25, 1982 discloses a recently developed system that operates without moving mechanical parts to regulate the flow of particulate solids. The system described therein is well adapted to a high mass flow, high temperature environment, and effectively functions as a non-mechanical valve. More specifically, the non-mechanical valve described in application Ser. No. 342,393 includes a standpipe located intermediate an upstream source of particulate solids and a downstream passage into which the particulate solids pass. The standpipe functions as a seal between the pressure at the upstream and downstream locations. The downstream end of the standpipe is configured to accommodate a slumped mass of particulate solids at its lowest point. A source of pressurized fluid communicates with a plenum chamber connected to the standpipe immediately upstream from the slumped mass.

In operation, the standpipe is always filled with particulate solids from the upstream source. Pressurized fluid imposes a pressure on the slumped mass of particulate solids to cause the particulate solids from the slumped mass to move downstream and into the downstream passage.

The rate of flow of particulate solids into the downstream passage varies directly with the magnitude of the pressure differential between the respective upstream and downstream sides of the slumped mass. Therefore, the rate of flow of particulate solids into the downstream passage can be varied by changing the pressure from the source of pressurized fluid. To change the pressure a mechanical valve can be provided intermediate the source of pressurized fluid and the plenum chamber. Appropriate adjustments to the valve then can be made to affect the rate of flow of particulate solids into the downstream passage. Alternatively, in application Ser. No. 342,393 it is shown that in certain applications a sensing line can extend from the pressure source to the steam lines in the associated furnace. The pressure then can be varied as a function of the steam conditions.

SUMMARY OF THE INVENTION

Experience has shown that in many applications it is desirable to vary the rate of flow of particulate solids to match the rate of solids received from upstream.

Accordingly, it is an object of the subject invention to provide an apparatus that will automatically regulate the flow of particulate solids.

It is another object of the subject invention to provide an apparatus that will automatically regulate the flow of particulate solids without relying upon moving mechanical parts.

It is an additional object of the subject invention to provide an apparatus that will automatically regulate the flow of particulate solids at a rate proportional to the height of particulate solids to be moved.

It is still another object of the subject invention to provide an apparatus to automatically regulate the flow of particulate solids in a high temperature, high mass flow environment.

It is still a further object of the subject invention to provide an apparatus to automatically regulate the flow of particulate solids, which apparatus is compatible with recently developed systems for causing the flow of particulate solids.

The subject invention is compatible with a variety of particulate solids flow systems. It is particularly well adapted to the system discussed above and described and claimed in U.S. patent application Ser. No. 342,393. Briefly, the system described in that application includes a standpipe extending from a source of particulate solids to a downstream passage for the particulate solids. The downstream end of the standpipe is adapted to accommodate a slumped mass of particulate solids. A source of pressurized fluid is directed into the standpipe through a plenum chamber immediately upstream of the slumped mass. As explained above, the higher pressure caused by the pressurized fluid urges the particulate solids from the slumped mass to the downstream passage, with a resultant flow of particulate solids from the source thereof and through the standpipe.

The apparatus of the subject invention comprises first and second pressurized fluid distributors located at the upstream end of the standpipe substantially adjacent the source of particulate solids. The pressurized fluid distributors may either be connected to a common or to separate sources of pressurized fluid.

The first pressurized fluid distributor delivers pressurized fluid into the bed of particulate solids located adjacent thereto at a flow rate sufficient to develop fluidization of the bed of particulate solids. More specifically, the flow rate of pressurized fluid is just above incipient fluidization of the particulate solids, but below the amount required for bubbling fluidization.

The second pressurized fluid distributor includes apertures for directing pressurized fluid, supplied through a fluid flow limiter, into the bed of particulate solids, and also includes a through line which connects to the plenum chamber at the downstream end of the standpipe. Pressurized fluid directed into the second pressurized fluid distributor is partially directed through the apertures therein and into the bed of particulate solids, and partially directed to the through line and into the plenum chamber at the downstream end of the standpipe. The proportional distribution of pressurized fluid between the apertures and the through line of the second pressurized fluid distributor is determined by the height of particulate solids in the source of particulate solids. More specifically, the pressurized fluid directed by the first and second pressurized fluid distributors into the bed of particulate solids creates a fluidized environment with a hydrostatic pressure that varies directly with the height of particulate solids in the source of particulate solids. This hydrostatic pressure is sensed by the apertures in the second pressurized fluid distributor. When the height of particulate solids is great, the hydrostatic pressure adjacent the apertures also will be great. As a result, a smaller proportion of the pressurized fluid that is directed into the second pressurized fluid distributor will pass through the apertures therein, and a correspondingly greater amount will be directed into the through line and to the plenum chamber. This increased rate of flow to the plenum chamber at the downstream end of the standpipe will increase the pressure on the upstream side of the slumped mass causing a greater flow of particulate solids into the downstream passage. Thus, a greater height of particulate solids in the source of particulate solids will be sensed by the second pressurized fluid distributor of the subject invention, which in turn will cause an increased flow rate of particulate solids at the downstream end of the standpipe.

As the height of particulate solids in the source of particulate solids decreases, the hydrostatic pressure adjacent the first and second pressurized fluid distributors also will decrease. This decrease in hydrostatic pressure will cause a greater proportion of the pressurized fluid that is directed into the second pressurized fluid distributor to pass through the apertures therein, and a correspondingly lower proportion to be directed to the through line. As a result, the flow rate of pressurized fluid to the plenum chamber at the downstream end of the standpipe will decrease causing a decreased pressure on the slumped mass, and a correspondingly lower flow rate of particulate solids into the downstream passage.

DETAILED DESCRIPTION OF THE PREFERRED EMBODIMENTS

Figure 1:
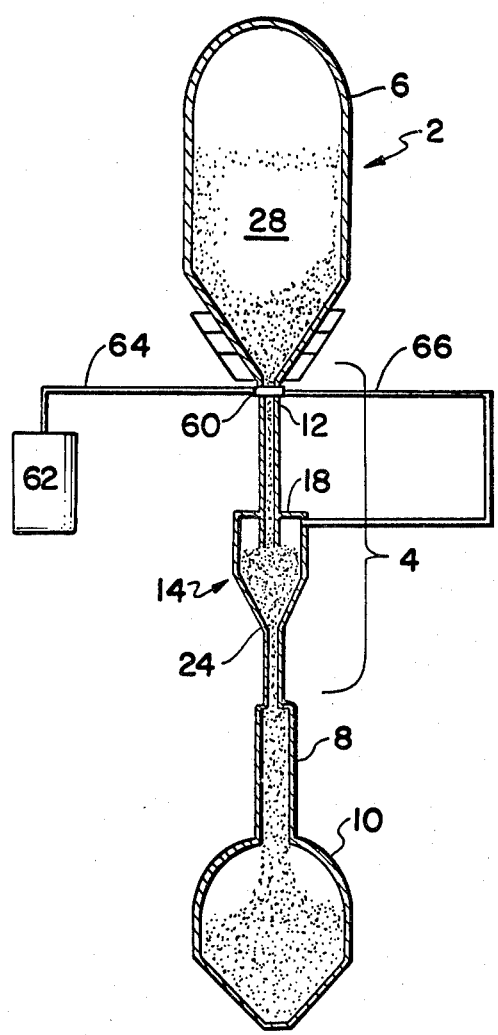
FIG. 1 is a schematic system for the flow of particulate solids in which the subject automatic pressure sensitive regulation assembly is employed.

The subject automatic pressure sensitive regulation assembly can be employed in many particulate solids flow devices. For example, in FIG. 1, the subject automatic pressure sensitive regulation assembly 60 is employed in a basic particulate solids flow system. The system 2 shown in FIG. 1 includes a particulate solids reservoir 6, a valve assembly indicated generally by the numeral 4, a particulate solids use system 8 and a particulate solids receiver reservoir 10. The valve assembly 4 of the system 2 shown in FIG. 1 includes a standpipe 12 which extends from the particulate solids reservoir 6 at the upstream end of valve 4 to a control hopper 14 located within valve 4. Control hopper 14 is in communication with line 66 which accommodates a flow of pressurized fluid into plenum chamber 18. In operation, particulate solids from particulate solids reservoir 6 flow through standpipe 12 and into control hopper 14. Pressurized fluid flows through line 66 into plenum chamber 18, and exerts a pressure upon the particulate solids in control hopper 14. This pressure urges the particulate solids from control hopper 14 through discharge fixture 24 and into particulate solids use system 8 and through solids receiver reservoir 10.

The subject automatic pressure sensitive regulation assembly 60 is located at the upstream end of standpipe 12 adjacent to particulate solids reservoir 6. As explained in greater detail below, the automatic pressure sensitive regulation assembly 60 is in communication with a source of pressurized fluid 62. Pressurized fluid from the source of pressurized fluid 62 is directed through line 64 and into the automatic pressure sensitive regulation assembly 60. In the manner described below, the automatic pressure sensitive regulation assembly 60 causes at least a local and incipient fluidization of the particulate solids 28 adjacent to it. The hydrostatic pressure in the fluidized particulate solids, adjacent to the automatic pressure sensitive regulation assembly 60, varies according to the height of the particulate solids in the particulate solids reservoir 6. Automatic pressure sensitive regulation assembly 60 also is in communication with the pressurized fluid line 66 which extends to the plenum chamber 18. As mentioned above, and as described further herein, automatic pressure sensitive regulation assembly 60 operates to vary the flow rate of pressurized fluid through line 66 directly in proportion to the height of particulate solids in the particulate solids reservoir 6. This greater flow rate of pressurized fluid to line 66 will cause an increased pressure in plenum 18 and thereby will increase the flow rate of particulate solids through control hopper 14 and into discharge fixture 24 and particulate solids receiver reservoir 10. Thus, the flow rate of particulate solids through the valve assembly 4 of the system 2 varies directly and automatically with the height of the particulate solids in the particulate solids reservoir 6.

Figure 2:
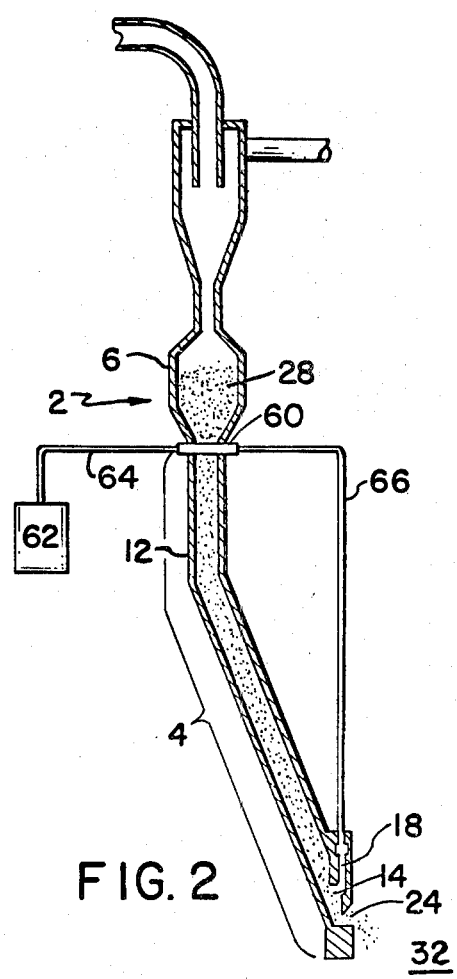
FIG. 2 is a partial cross-sectional view of a fluidized bed furnace in which the subject automatic pressure sensitive regulation assembly is employed.

FIG. 2 shows another example of the subject automatic pressure sensitive regulation assembly 60 in an operational environment. In this example, automatic pressure sensitive regulation assembly 60 is employed to return collected solids to a fluidized bed furnace. Parts of the system shown in FIG. 2 that are comparable to parts of the system shown in FIG. 1 are numbered identically. Briefly, the fluidized bed furnace 32 of FIG. 2 emits a mixture of gas and suspended particulate solids which are separated by a cyclone or other equivalent device from which the particulate solids are directed into a solids collection reservoir 6. The solids collection reservoir contains a fluidized bed of particulate solids 28 which flow by gravity into standpipe 12 extending to control hopper 14, and thence return to the fluidized bed furnace 32. Pressurized fluid line 64 extends from a source of pressurized fluid 62 to the automatic pressure sensitive regulation assembly 60, and accommodates the flow of pressurized fluid thereto. Pressurized fluid line 66 in turn extends from the automatic pressure sensitive regulation assembly 60 to the plenum chamber 18, and accommodates the flow of pressurized fluid flow into the plenum chamber 18 as described above. This example employs the same principles described above. Briefly, pressurized fluid flowing through line 64 and into the automatic pressure sensitive regulation assembly 60 causes incipient fluidization of the particulate solids adjacent to the automatic pressure sensitive regulation assembly 60. The hydrostatic pressure in these fluidized particulate solids varies according to the height of the particulate solids in the fluidized bed 28. The rate of flow of pressurized fluid through line 66 to the plenum chamber 18 varies directly with the hydrostatic pressure sensed by the automatic pressure sensitive regulation assembly 60. Thus, as with the example described in FIG. 1, as the height of particulate solids in fluidized bed 28 increases, a greater flow of pressurized fluid is directed through the plenum chamber 18 causing a more rapid flow of particulate solids into the fluidized bed furnace 32.

Figure 4:
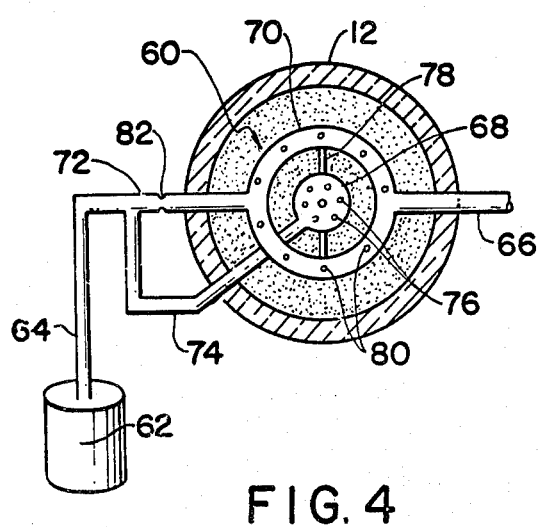
FIG. 4 is a plan view partially in section of the subject automatic pressure sensitive regulation assembly employed in a particulate solids flow apparatus.
Figure 3:
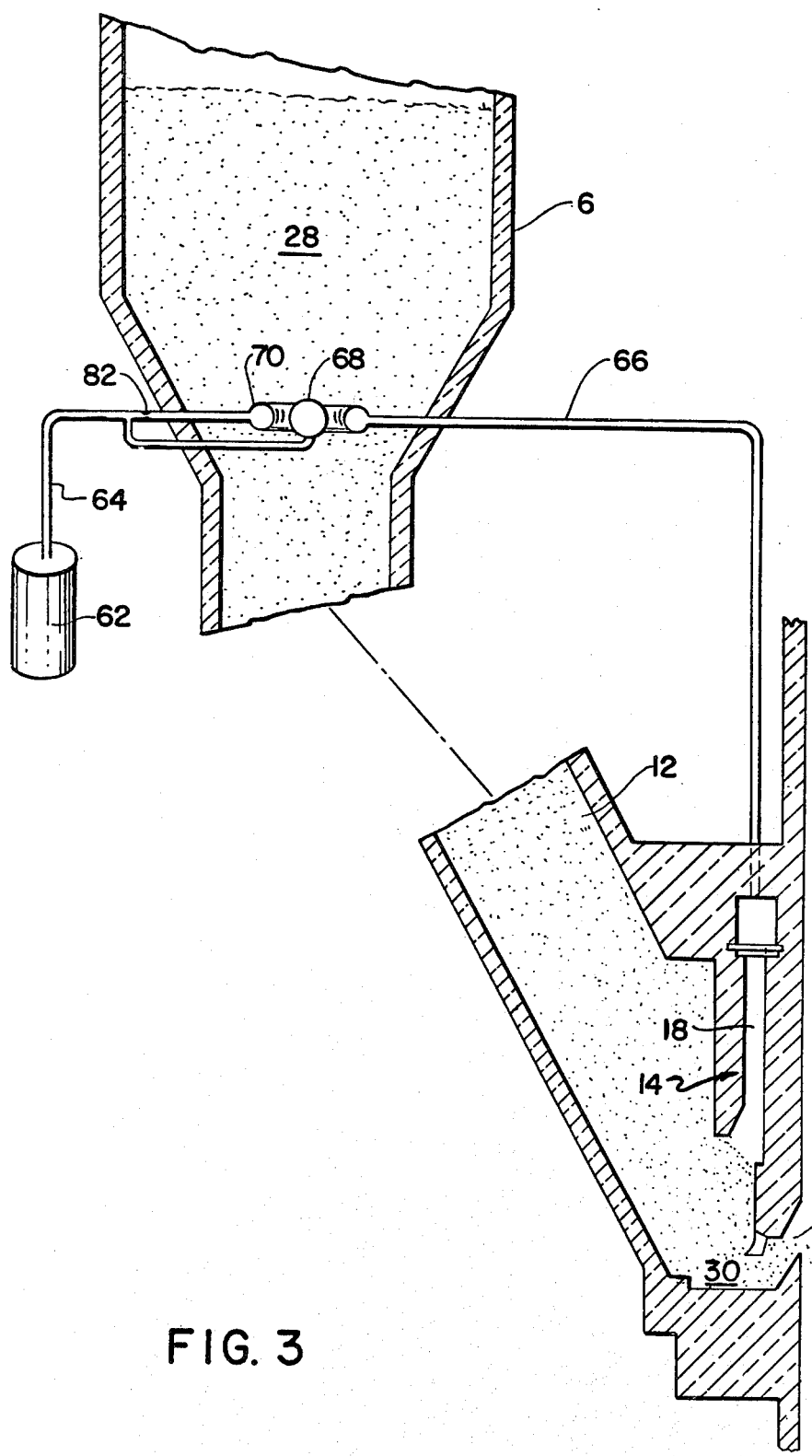
FIG. 3 is a cross-sectional side view of the subject automatic pressure sensitive regulation assembly employed in a particulate solids flow apparatus.

Turning to FIGS. 3 and 4, the preferred embodiment of the subject automatic pressure sensitive regulation assembly 60 is shown in greater detail. This particular embodiment of the automatic pressure sensitive regulation assembly 60 is shown with the valve assembly 4 of the fluidized bed furnace 32 described above and shown generally in FIG. 2.

As shown in FIG. 3, the automatic pressure sensitive regulation assembly is located at the upstream end of a standpipe 12 adjacent the fluidized bed of particulate solids 28. The automatic pressure sensitive regulation assembly 60 includes first and second pressurized fluid distributors, which are defined by an inner chamber 68 and an outer ring 70. The inner chamber 68 and the outer ring 70 are dimensioned and disposed to be substantially centrally located within the outlet of solids collection reservoir 6, such that particulate solids may easily pass by the automatic pressure sensitive regulation assembly 60. Pressurized fluid lines 72 and 74 extend from the pressurized fluid line 64 directly to inner chamber 68 and via fluid flow limiter 82 to the outer ring 70. Thus, pressurized fluid from the pressure source 62 flows through the pressurized fluid line 64 and into both lines 72 and 74 to both inner chamber 68 and outer ring 70. Alternatively, the inner chamber 68 and the outer ring 70 of the automatic pressure sensitive regulation assembly 60 can be connected to separate pressure sources provided flow limiter 82 is included in the outer ring fluid supply.

Inner chamber 68 has a plurality of apertures 76 through which pressurized fluid may pass. The sizes of apertures 76 and line 74 are sufficient to enable a rate of flow of pressurized fluid that will cause incipient fluidization of the particulate solids adjacent the automatic pressure sensitive regulation assembly 60.

Outer ring 70 is connected, via flow limiter 82, to pressurized fluid lines 72 and directly to control line 66. The inner chamber 68 and the outer ring 70 are maintained in their proper positions with respect to one another by support struts 78.

The outer ring 70 is provided with a plurality of pressure sensing apertures 80. In operation, a portion of the pressurized fluid flowing into the outer ring 70 exits therefrom through pressure sensing apertures 80, and the remainder of the pressurized fluid exits through pressurized fluid control line 66. A flow limiter 82, such as a restricting orifice, is provided in pressurized fluid line 72 to fix the total rate of flow of pressurized fluid to outer ring 70.

In operation, pressurized fluid is directed through the pressurized fluid line 64 from the pressure source 62 into both lines 72 and 74. The pressurized fluid that flows through line 74 enters inner chamber 68 and exits therefrom through the plurality of holes 76. As explained above, this rate of flow of pressurized fluid through the holes 76 is sufficient to cause incipient fluidization of the particulate solids adjacent the automatic pressure sensitive regulation assembly 60.

The pressurized fluid from pressure source 62 enters line 72, and passes through the restricting orifice 82 and flows at a near constant rate into the outer ring 70. Part of the pressurized fluid that enters outer ring 70 exits therefrom through pressure sensing apertures 80, while the remainder of the pressurized fluid entering outer ring 70 continues into pressurized line 66. Consequently, as the flow through pressure sensing apertures 80 decreases, the flow through pressurized fluid line 66 will increase. The opposite, of course, is also true.

The amount of pressurized fluid exiting through pressure sensing apertures 80 on outer ring 70 is proportional to the height of particulate solids in the fluidized bed of particulate solids 28. Specifically, the particulate solids that have been fluidized by pressurized fluid directed through holes 76 of inner chamber 68 will have a hydrostatic pressure that varies directly with the height of particulate solids in fluidized bed 28. Therefore, as the height of particulate solids in fluidized bed 28 increases the hydrostatic pressure in the fluidized particulate solids also will increase. The variations in hydrostatic pressure are sensed by the pressure sensing apertures 80 in outer ring 70. As the hydrostatic pressure increases, less pressurized fluid will exit from outer ring 70 through pressure sensing apertures 80, and a correspondingly greater amount will flow into pressurized fluid line 66.

As explained above, pressurized fluid line 66 is connected to plenum chamber 18. Thus, as flow increases in pressurized fluid line 66, it also will increase in plenum chamber 18. This increased flow through plenum chamber 18 causes a greater pressure on the slumped mass 30 at the downstream end of standpipe 12, thereby causing a greater rate of flow of particulate solids from standpipe 12 into discharge passage 24.

To summarize this facet of the operation, the increased height of particulate solids raises the hydrostatic pressure at automatic pressure sensitive regulation assembly 60. The increased hydrostatic pressure causes less pressurized fluid to be directed through pressure sensing apertures 80 in outer ring 70 and a corresponding increase in pressurized fluid to be directed through pressurized fluid line 66. This increased flow of pressurized fluid is directed through line 66 and into plenum chamber 18, to cause an increased flow of particulate solids from standpipe 12 to discharge passage 24.

Automatic pressure sensitive regulation assembly 60 similarly reacts to decreases in the height of particulate solids in the fluidized bed 28. Specifically, as the height of particulate solids in fluidized bed 28 decreases, due to the flow through standpipe 12, the hydrostatic pressure adjacent automatic pressure sensitive regulation assembly 60 also decreases. Pressurized fluid in outer ring 70 automatically will adapt to these changed hydrostatic pressure conditions so that more pressurized fluid will pass through pressure sensing apertures 80, and less will pass through pressurized fluid line 66. As a result, the pressure in plenum chamber 18 will decrease and the rate of flow of particulate solids from standpipe 12 to discharge passage 24 also will decrease.

It has been found that with scintered alumium (Norton Co. 60/F) particulate solids in solids collection reservoir 6 and with 0 inches water gage (WG) pressure in the space above the solids and with the particular size and number of holes 76 used in inner ring 68, a fluid pressure of 40-50 WG delivered through line 74 will be sufficient to provide incipient fluidization when the height of solids above the inner chamber 68 is in the range of 10 to 20 inches. It also has been found, for example, that when the height of solids above the inner chamber 68 is 16.5 inches, the hydrostatic pressure sensed by outer ring 70 will be 33 WG, and the pressure at the control plenum chamber 18 will approach 33 inches. The hydrostatic pressure at the outer ring 70 will vary from 2 WG to 40 WG according to changes in the height of solids in reservoir 6 and backpressure beyond discharge passage 24.

The hydrostatic pressure in outer ring 70 and corresponding pressure, via line 66, in plenum chamber 18 will always be equal to or higher than the pressure beyond discharge passage 24 and is determined by the receiver pressure and differential pressure required to discharge the particulate solids at the same rate as collected in the solids collection reservoir 6.

What is claimed:

1. An automatic pressure sensitive regulation assembly for regulating the flow of particulate solids between upstream and downstream reservoirs of particulate solids by metering the flow of fluid provided to urge the particulate solids to flow from the upstream reservoir to the downstream reservoir comprising:
   means for the passage of particulate solids between said upstream and downstream reservoir;
   at least one source of pressurized fluid;
   a first pressurized fluid distributor located in the particulate solids upstream of the downstream solids reservoir in said means for the passage of the particulate solids between said upstream and downstream reservoir;
   means for delivering pressurized fluid from said source of pressurized fluid through said first pressurized fluid distributor at a rate to cause incipient fluidization of the particulate solids adjacent said first pressurized fluid distributor and an attendant hydrostatic pressure;
   a second pressurized fluid distributor;
   means for delivering pressurized fluid from said source of pressurized fluid through the second pressurized fluid distributor to urge the particulate solids to the downstream reservoir;
   and means to sense variations in said hydrostatic pressure as a function of the height of the particulate solids above the first pressurized fluid distributor and to meter the flow through the second pressurized fluid distributor of fluid provided to urge the particulate solids to the downstream reservoir as a function of said hydrostatic pressure;
   whereby as the height of the particulate solids above the first pressurized fluid distributor increases, the flow of fluid to urge the solids to the downstream reservoir will become greater.

2. An automatic pressure sensitive regulation assembly as in claim 1 wherein the first pressurized fluid distributor is a chamber having a plurality of holes for directing pressurized fluids into said particulate solids causing incipient fluidization thereof.

3. An automatic pressure sensitive regulation assembly as in claim 1, further comprising a plenum chamber intermediate said automatic pressure sensitive regulation assembly and said downstream reservoir of particulate solids, and wherein the second pressurized fluid distributor and the means to sense variations in said hydrostatic pressure is comprised of a ring having a plurality of pressure sensing apertures for sensing the hydrostatic pressure of the fluidized particulate solids, which ring is located in the particulate solids at the location wherein the incipient fluidization caused by the fluid passing through the first pressurized fluid distributor is occuring, said ring being in communication with said plenum chamber such that changes in hydrostatic pressure sensed by said pressure sensing apertures cause a corresponding change in the flow of pressurized fluids to said plenum chamber thereby changing the flow of particulate solids to said downstream reservoir of particulate solids.

4. An automatic pressure sensitive regulation assembly as in claim 3, wherein said means for the passage for particulate solids between the upstream to the downstream reservoir is a passage between the upstream and dowstream reservoirs, said assembly is located above the outlet of the upstream reservoir leading to the passage between the upstream and downstream reservoirs adjacent said passage for the particulate solids and wherein said plenum chamber is located adjacent said downstream reservoir of particulate solids.

5. An automatic pressure sensitive regulation assembly as in claim 3 further comprising a flow limiter in the means for delivering pressurized fluid to the second pressurized fluid distributor.

6. An automatic pressure sensitive regulation assembly as in claim 1 having a single source of pressurized fluid in communication with both said first and second pressurized fluid distributors.

7. An automatic pressure sensitive regulation assembly for automatically regulating the flow of particulate solids from an upstream location, through a valve and to a downstream location, said automatic pressure sensitive regulation assembly being disposed in said valve and adjacent said upstream location, said automatic pressure sensitive regulation assembly comprising:
   a source of pressurized fluid;
   an inner chamber in communication with said source of pressurized fluid and having a plurality of holes disposed therein, pressurized fluid from said source of pressurized fluid being distributed through said holes in said inner chamber at a sufficient rate to cause incipient fluidization of the particulate solids adjacent thereto;
   an outer ring in communication with said source of pressurized fluid and having a plurality of pressure sensing apertures disposed therein for distributing into said fluidized particulate solids adjacent thereto a portion of the pressurized fluid directed into said outer ring;

a plenum chamber in communication with said outer ring and disposed in a portion of said valve adjacent said downstream location, said plenum chamber for directing into said particulate solids the pressurized fluid from said outer ring that is not distributed through the pressure sensing apertures thereof, such that the hydrostatic pressure of the fluidized particulate solids adjacent the automatic pressure sensitive regulation assembly varies directly with the height of particulate solids in the upstream location, and such that the portion of pressurized fluid from said outer ring directed to said plenum chamber varies directly with the hydrostatic pressure adjacent said automatic pressure sensitive regulation assembly.

8. A method for automatically regulating the flow of particulate solids through a valve from an upstream location to a downstream location at a flow rate directly proportional to the height of particulate solids at the upstream location, said method comprising the steps of:

creating incipient fluidization of the particulate solids in said valve at a portion thereof adjacent said upstream location to produce hydrostatic pressure;

varying the hydrostatic pressure as a function of the height of the particulate solids above the location of incipient fluidization;

directing a stream of pressurized fluid through the location of incipient fluidization;

discharging a portion of the stream of pressurized fluid into the particulate solids as a function of the hydrostatic pressure;

directing to a location on said valve adjacent said downstream location the remaining portion of said stream of pressurized fluid for urging into said downstream location an amount of particulate solids directly proportional to said remaining portion of said stream of pressurized fluid.

9. A method as in claim 8 wherein the incipient fluidization of the particulate solids is created by fluid delivered through a distributor with apertures on the surface thereof and the stream of pressurized fluid discharged into the particulate solids is discharged through apertures on the surface of a ring.

* * * * *